US005473816A

United States Patent [19]

Harden, Jr. et al.

[11] Patent Number: 5,473,816

[45] Date of Patent: Dec. 12, 1995

[54] TOOL AND METHOD FOR MAINTAINING ALIGNMENT WHEN SEPARATING AND CONNECTING MULTI-PIN CONNECTORS

[75] Inventors: James A. Harden, Jr.; Steven E. Garcia, both of Colorado Springs, Colo.

[73] Assignee: Cray Computer Corporation, Colorado Springs, Colo.

[21] Appl. No.: 183,603

[22] Filed: Jan. 19, 1994

[51] Int. Cl.$^{6}$ .............................. H01R 43/20; B23P 19/04

[52] U.S. Cl. .............................. 29/876; 29/239; 29/758; 29/764

[58] Field of Search .............................. 29/278, 758, 764, 29/876, 239, 826

[56] References Cited

U.S. PATENT DOCUMENTS

| | | | |
|---|---|---|---|
| 2,513,821 | 7/1930 | Schneider . | |
| 3,087,235 | 9/1963 | Porter . | |
| 3,117,370 | 1/1964 | Kaupp et al. . | |
| 3,443,297 | 5/1969 | Lusby, Jr. . | |
| 3,453,586 | 7/1969 | Brendlen, Jr. . | |
| 3,951,514 | 4/1976 | Medina, Jr. . | |
| 4,468,858 | 9/1984 | Gulberg et al. | 29/764 |
| 4,583,287 | 4/1986 | McDevitt et al. | 29/758 X |

*Primary Examiner*—Carl J. Arbes
*Attorney, Agent, or Firm*—Holland & Hart

[57] ABSTRACT

Male and female portions of a multi-pin connector (MPC) are separated and connected using a tool or a method in which the two MPC portions are securely retained in lateral and longitudinal alignment throughout separation and connection, to alleviate the difficulties of breaking, bending, mis-aligning and twisting pins of the male MPC portion relative to sockets of the female MPC portion, which may easily occur during separation and connection. The pins and the sockets in lateral and longitudinal alignment while the MPC portions are moved toward and away from one another. The risk of lead-wire breakage due to fatigue from grasping the lead wires during connection and separation is also avoided, because the only contact is with the body portions, not the lead wires, of even small MPCs. A tool includes a receptacle adapted for receiving the two portions of the MPC. A slide member is adapted to contact at least one of the two MPC portions, and an actuator mechanism moves the slide member and the contacted MPC portion toward or away from the other MPC portion.

21 Claims, 6 Drawing Sheets

TOOL AND METHOD FOR MAINTAINING ALIGNMENT WHEN SEPARATING AND CONNECTING MULTI-PIN CONNECTORS

This invention relates to a new and improved tool and method for separating and connecting multi-pin connectors (MPCs), and more particularly to a tool and method that securely positions portions of the MPC in lateral and longitudinal alignment with one another throughout their separation and connection to avoid damage to the pins.

BACKGROUND OF THE INVENTION

MPCs are widely used throughout the electronics industry to connect a relatively large number of electrical conductors. An MPC is generally formed of two connector portions. One portion of the MPC is a male portion having a plurality of projecting electrical pins aligned in a predetermined pattern, such as rows or concentric circles. The pins individually connect through a body of the connector portion to lead wires. The other or female portion of the MPC has sockets or receptacles located in corresponding positions to receive the pins of the male portion. The sockets also individually connect to lead wires through the body of the female connector portion. When the MPC portions are connected and the pins of the male portion are inserted into the corresponding sockets of the female portion, an electrical connection through the pins and sockets establishes continuous electrical conductivity between the lead wires attached to the MPC portions.

One of the common uses of MPCs is for the connection of circuit boards to other electronic equipment. In this situation components on the circuit board are connected to the lead wires of one portion of the MPC. The lead wires of the other portion of the MPC are connected to other electronic equipment. Electrical power is supplied to the circuit board and signals are conducted to or from the circuit board through the lead wires and the connected MPC portions. If a component on the circuit board or the entire circuit board fails, it is convenient to disconnect the MPC portions and replace the circuit board and MPC portion attached to the faulty circuit board, rather than disconnect each lead wire from the faulty circuit board and then reconnecting the lead wires to a new circuit board. The use of MPCs in this way results in efficient and convenient replacement of the failed electrical equipment. Traditionally, MPC portions have been separated and connected by hand. In separating or connecting the MPC, the user must grasp both portions of the MPC with his or her fingers and forcibly separate or connect the two MPC portions. Small MPC connector portions with a large number of small pins and small sockets are difficult to align when connecting and separating them by hand.

Failure to maintain proper alignment of the MPC portions when separating or connecting them can damage the pins, sockets or lead wires. Pins on the MPC can be bent or broken if the user mis-aligns, twists, or bends each MPC portion relative to the other when separating or connecting them. Misalignment occurs when any of the pins are offset in any direction from their intended sockets. If misalignment occurs, the pin or pins that are not matched with sockets bend over or break when the connector portions are forced together.

Twisting results from the user bending each portion of the MPC relative to the other during the separation or connection of the portions, usually to assist the separation of the MPC portions. Twisting occurs relatively easily, particularly with relatively small MPCs. Twisting can break or bend the pins, thereby damaging the male MPC portion. If the pins are bent during separation of the MPC portions, and then later the MPC portions are attempted to be connected, the bent pins are likely to mis-align and then break or bend over. Lead wire breakage can also occur during separation and connection. Often the user grasps the lead wires because the bodies of the MPC portions are small or difficult to manipulate. Fatigue stress from repeated tension and compression forces on the lead wires caused by manually gripping the lead wires while connecting and disconnecting the MPC frequently results in broken lead wires. Lead wire failure is difficult to detect because the insulation covering the lead wires obscures the break in the internal conductor.

Replacing a defective MPC portion is difficult because of the relatively large amount of labor involved. At times the labor cost of disconnecting the lead wires of the MPC from the circuit board is greater than simply replacing the circuit board entirely.

It is against this background that significant improvements and advancements have evolved in the field of separating and connecting MPCs.

SUMMARY OF THE INVENTION

The present invention advantageously allows the male and female portions of an MPC to be securely positioned in lateral and longitudinal alignment throughout separation and connection. The lateral and longitudinal support throughout separation and connection alleviates the difficulties of breaking, bending, misaligning and twisting the pins, which may easily occur during separation and connection. The risk of lead-wire breakage due to fatigue from grasping the lead wires during connection and separation is also avoided, because the only contact is with the body portions, not the lead wires, of even small MPCs.

In accordance with these and other features, one aspect of the present invention relates to a new and improved MPC separator tool and MPC connector tool. The tools are used for separating or connecting two portions of a multi-pin connector (MPC). The tool includes a head unit having a receptacle adapted for receiving the two portions of the MPC. The head unit includes a slide member extending to the receptacle and adapted to contact at least one of the two MPC portions. An actuator mechanism is operably connected to the head unit to move the slide member and the one MPC portion contacted by the slide member in at least one of a direction toward or a direction away from the other MPC portion to execute one of either connecting or separating the MPC portions, respectively. The MPC portions are retained in the receptacle by contact with the slider member during movement of the MPC portions to maintain the pins and the sockets in lateral and longitudinal alignment with one another during connecting and separating to avoid bending, breaking or twisting the pins.

In accordance with the above summarized features, another aspect of the present invention relates to a new and improved method of connecting and separating MPC portions. Each of the MPC portions includes a body, and the body of one of the MPC portions has a plurality of pins projecting therefrom, and the body of the other one of the MPC portions has a plurality of sockets positioned in locations corresponding to the pins. The sockets receive the pins when the MPC portions are connected. The method includes the steps of mechanically retaining the bodies of the MPC portions relative to one another with the pins and the sockets in lateral and longitudinal alignment with one another, and moving the MPC portions toward and away from one another while maintaining the longitudinal and lateral alignment of the pins and sockets to accomplish one of connecting or separating the MPC portions, respectively, without bending, twisting or breaking the pins.

A more complete appreciation of the present invention and its scope can be obtained from the accompanying drawings, which are briefly summarized below, the following detailed description of presently preferred embodiments of the invention, and the appended claims.

DETAILED DESCRIPTION

Figure 1:
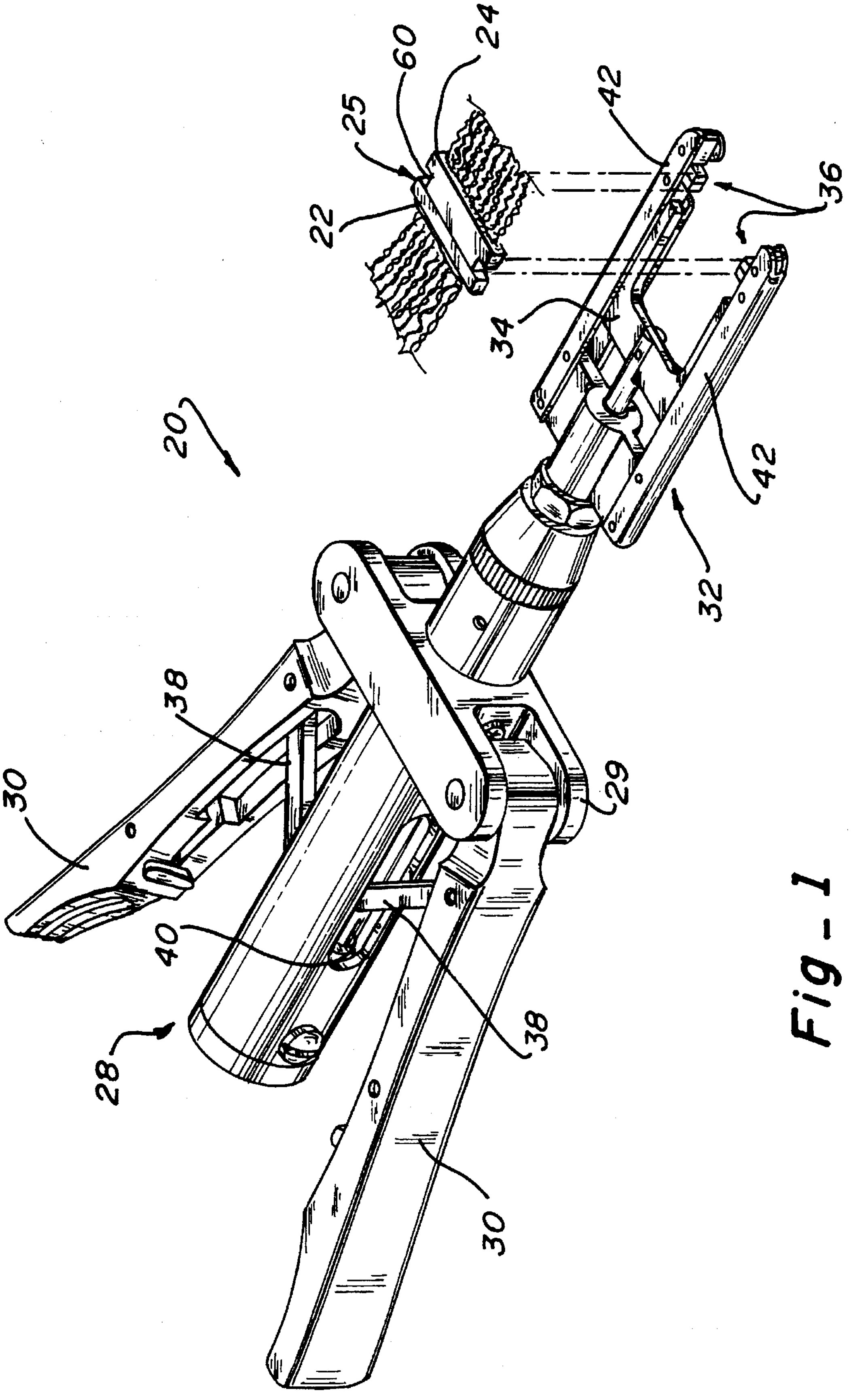
FIG. 1 is a perspective view of a tool incorporating the present invention, which is used for separating a prior art multi-pin connector (MPC), such as the MPC shown for insertion into the tool.
Figures 6, 11, 12:
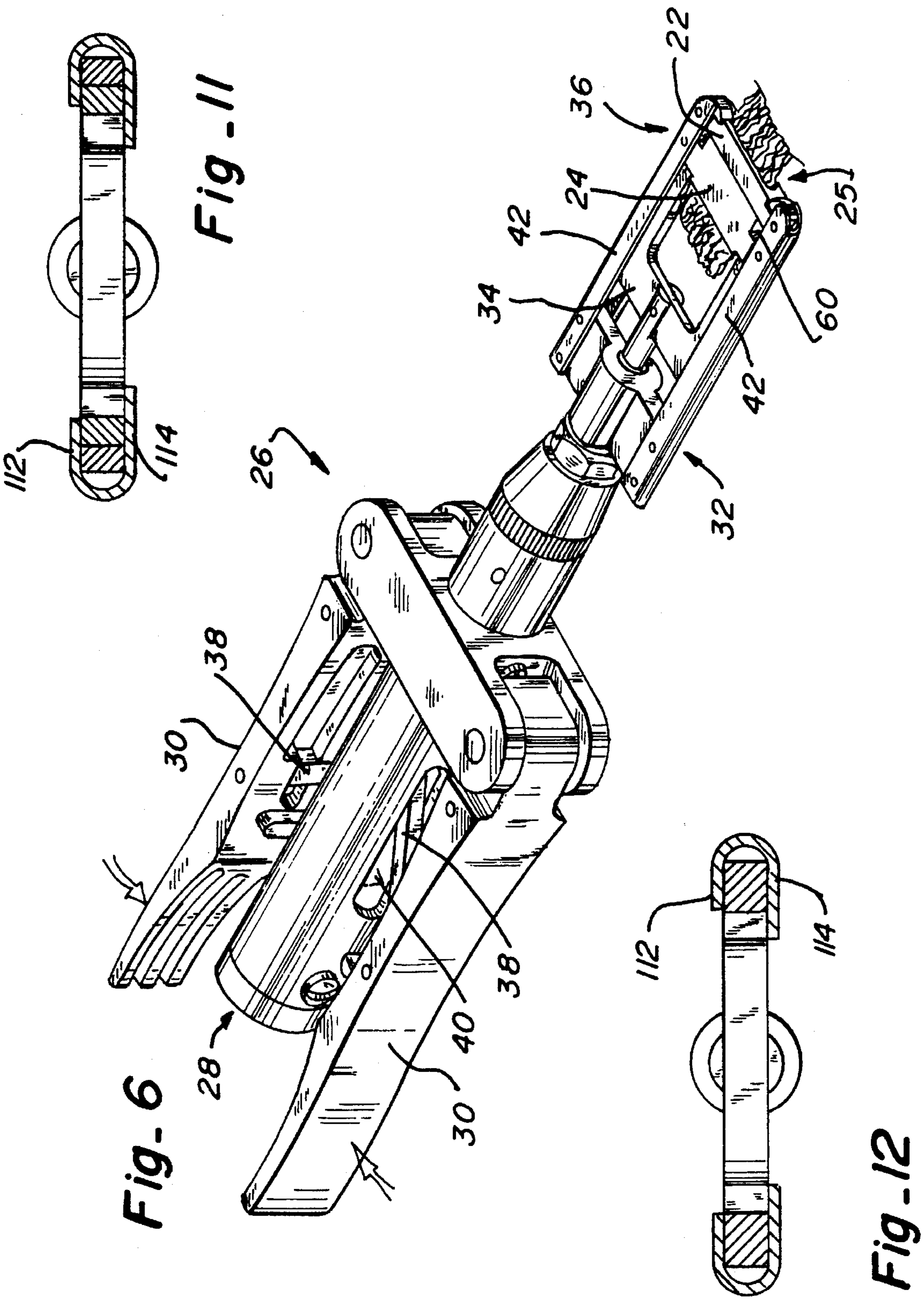
FIG. 6 is a complete perspective view of a connecting tool having the head unit shown in FIG. 5, upon connecting the MPC portions.
FIG. 11 is a vertical plane section view, taken substantially in the plane of line 11—11 of FIG. 10.
FIG. 12 is a vertical plane section view, taken substantially in the plane of line 12—12 of FIG. 8.

One tool 20 which embodies the present invention and which is used to disconnect or separate portions 22 and 24 of an MPC 25 is shown in FIG. 1. A tool 26 which also embodies the present invention and which is used to connect the MPC portions 22 and 24 is shown in FIG. 6. Each tool 20 and 26 includes a main body 28, a pair of handles 30, a head unit 32 connected to the forward end of the main body 28, a slide member 34 operative within the head unit 32 and a receptacle 36 located generally at the forward end of the head unit 32 and the slide member 34.

The handles 30 of the tools 20 and 26 are pivotably connected at forward ends thereof to a handle frame 29 attached at the forward end of the main body 28. The handles are also pivotably connected by links 38 at a midpoint thereof to an actuating mechanism 40 within the main body 28. The links 38 are positioned as shown in FIG. 1 in the separator tool 20 and are positioned as shown in FIG. 6 in the connector tool 26. The slide 34 is movably positioned within a pair of rails 42 of the head unit 32. Squeezing the handles 30 toward the main body 28 causes an actuating mechanism 40 to move the slide 34 within the head unit 32 to connect and disconnect the MPC portions 22 and 24.

Figure 4:
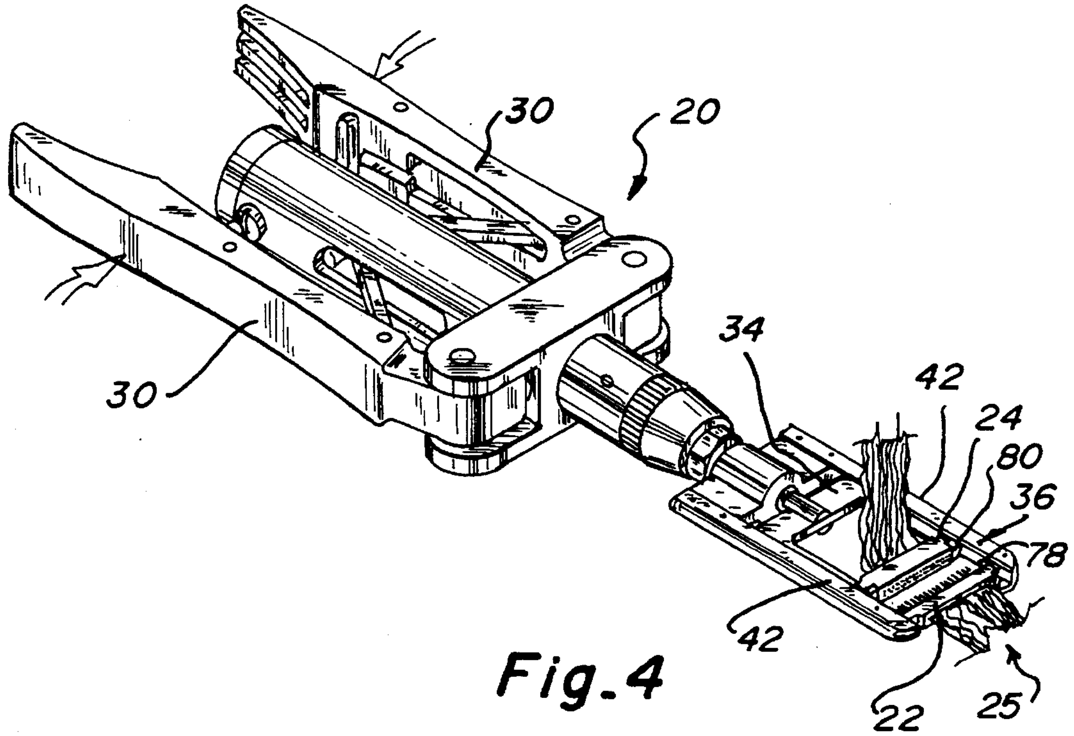
FIG. 4 is a perspective view of the tool shown in FIG. 1 showing separation of the MPC portions.

The receptacle 36 of the separator tool 20 has a shape adapted to receive and interact with the connected portions 22 and 24 of the MPC 25, as shown in FIG. 1. With the connected MPC portions 22 and 24 positioned within the receptacle 36 of the tool 20, the slide 34 engages at least one of the MPC portions 22 and 24 in the receptacle. When the handles 30 are squeezed, the slide 34 is retracted along the rails 42, and the MPC portions 22 and 24 separate, as shown in FIG. 4.

Figure 5:
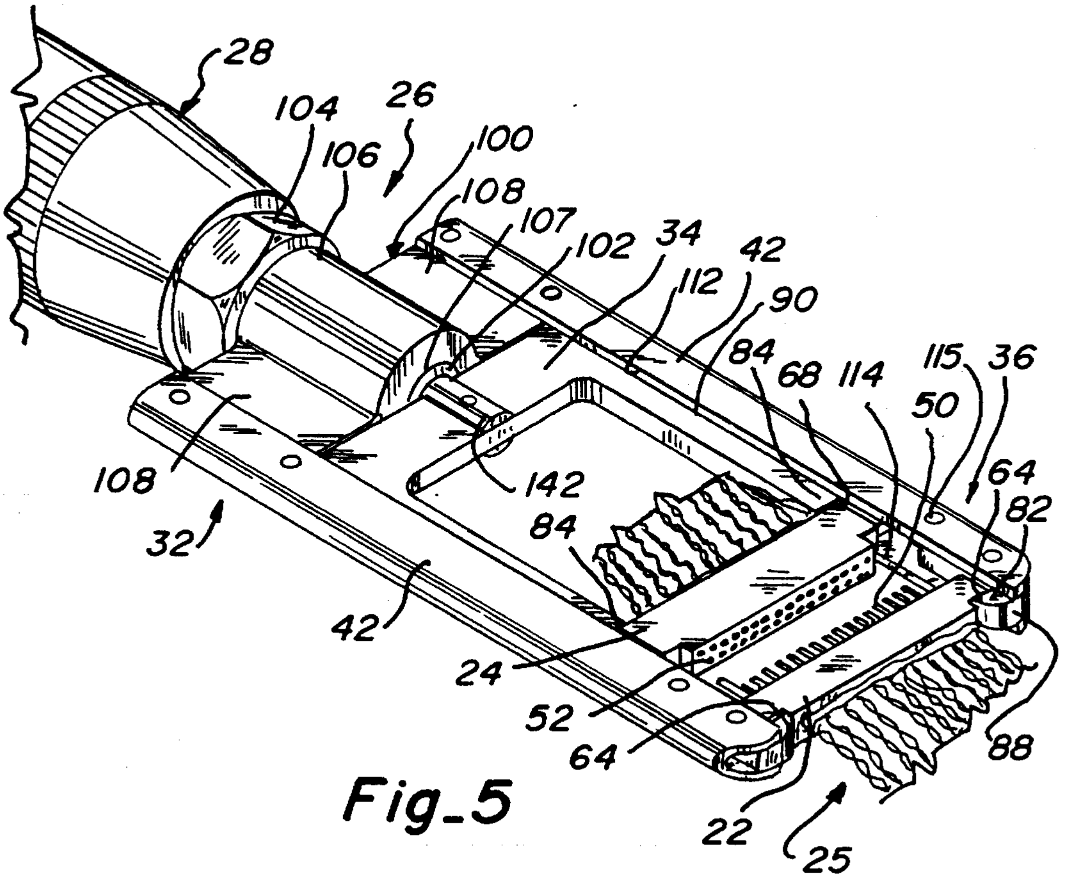
FIG. 5 is an enlarged perspective view of a head unit of another tool also incorporating the present invention similar to that shown in FIG. 1, but instead used for connecting the portions of the MPC shown in FIG. 2.

The receptacle 36 of the connector tool 26 has a shape adapted to receive and interact with the separated portions 22 and 24 of the MPC 25, as shown in FIGS. 5 and 6. With the separated MPC portions 22 and 24 positioned within the receptacle 36 of the tool 26, the slide 34 engages at least one of the MPC portions 22 and 24 in the receptacle 36. When the handles 30 are squeezed, the connector slide 34 advances forward along the rails 42 and connects or joins the MPC portions 22 and 24, as shown in FIG. 6.

Figure 2:
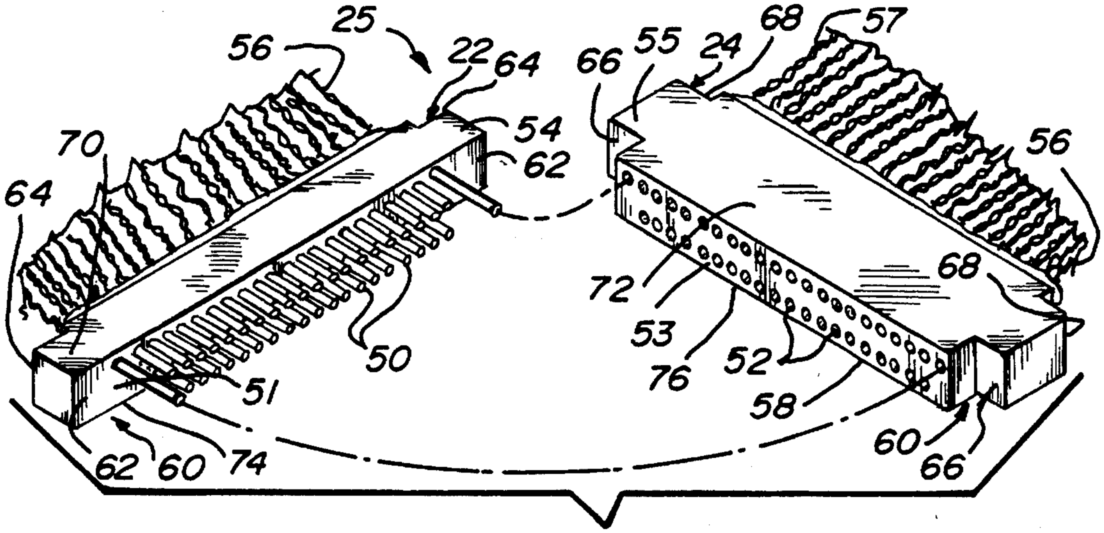
Fig 2 PRIOR ART
FIG. 2 is an enlarged perspective view of two separated portions of the prior art MPC shown in FIG. 1, illustrating the configuration of the pins and the sockets.

The separation and connection of the MPC portions 22 and 24 can be better appreciated by comprehension of the features of the MPC 25 itself. The MPC 25, as shown in FIG. 2, is made up of the two MPC portions 22 and 24, respectively a male portion and a female portion. The male portion 22 includes a plurality of pins 50 that project out from a surface 51 of an electrically insulated body 54. The female portion 24 includes a plurality of sockets 52 indented inward from a surface 53 of an electrically insulated body 55. The position of the sockets 52 in the surface 53 corresponds to the position of the pins 50 in the surface 51 so that when the bodies 54 and 55 are connected with the surfaces 51 and 53 abutting one another, the pins 50 align with and fit within the sockets 52. A connection plane or area 58 of the MPC portions 22 and 24 is formed by the abutted surfaces 51 and 53 when the portions 22 and 24 are connected. When the MPC portions 22 and 24 are separated, the pins 50 of the male portion 22 retract completely out of the sockets 52 of the female portion 24.

The electrically insulated bodies 54 and 55 rigidly retain the pins 50 and sockets 52, respectively. In addition, the pins 50 and sockets 52 are connected to lead wires 56 and 57 within the bodies 54 and 55, respectively. The lead wires 56 and 57 extend away from each MPC portion 22 and 24 and connect to other electrical equipment (not shown).

Figure 3:
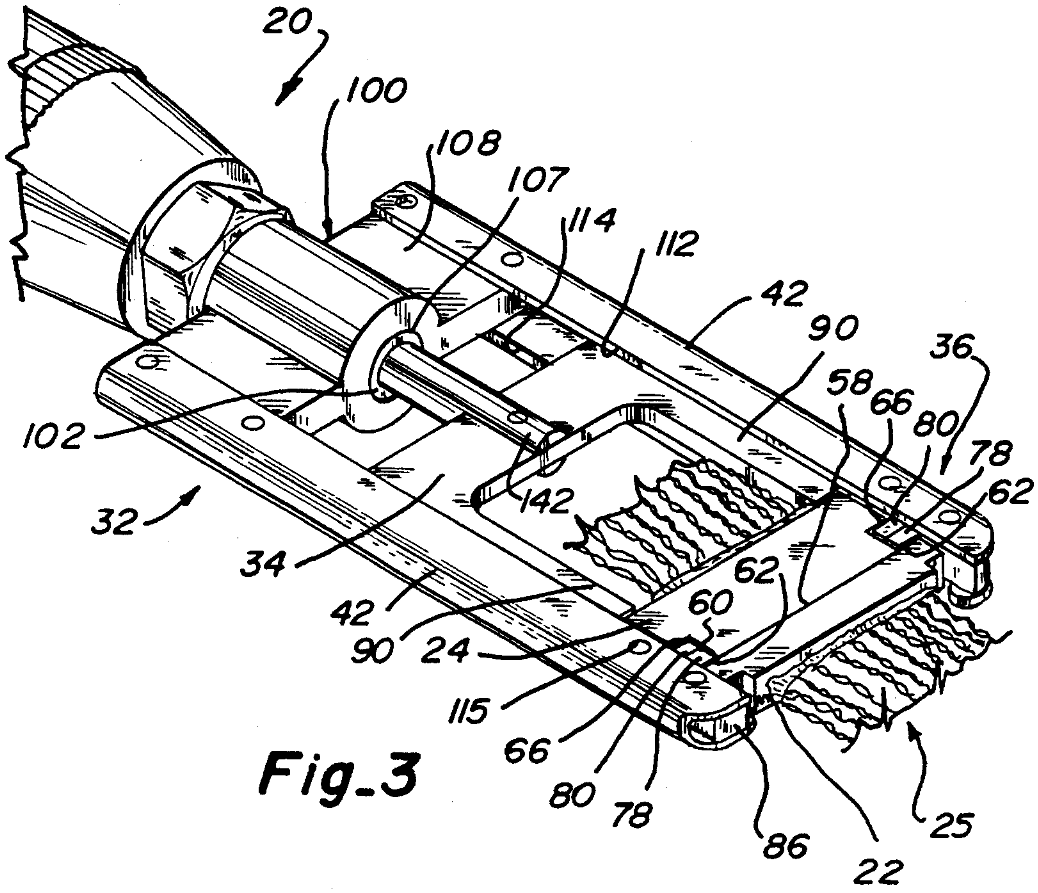
FIG. 3 is an enlarged perspective view of a head unit of the tool shown in FIG. 1, with the MPC inserted into a receptacle of the head prior to separating the portions of the MPC.

The bodies 54 and 55 of the MPC 25 have a plurality of laterally opposing shoulders 62, 64, 66 and 68, as shown in FIG. 2. When the portions 22 and 24 of the MPC 25 are connected, shoulders 62 and 66 form two laterally opposing notches 60 indented inward at opposite lateral sides of the connector 25, as shown in FIG. 3. Top faces 70 and 72 of each portion 22 and 24 laterally oppose bottom faces 74 and 76 of each portion 22 and 24, respectively, as shown in FIG. 2.

The receptacle 36 in the separator tool 20 shown in FIGS. 1 and 3 is adapted to receive the two connected MPC portions 22 and 24 of the MPC 25. The receptacle 36 of the separation tool 20 has two pairs of inwardly facing laterally opposing tabs 78 and 80. The tabs 78 are stationarily connected to the head unit 32, and tabs 80 are connected to the slide 34 and are therefore movable with the slide 34 relative to tabs 78. The tabs 78 and 80 are normally in longitudinal abutment on opposite lateral sides of the receptacle 36 of the separation tool 20. When the connected MPC portions 22 and 24 are placed in the receptacle 36, the tabs 78 and 80 fit into the notch 60. Inside notch 60, the tabs 78 engage the shoulders 62, while the tabs 80 engage shoulders 66.

During separation of the MPC portions 22 and 24, the tabs 78 remain stationary while engaging shoulders 62, effectively keeping MPC portion 22 stationary. Squeezing the handles 30 moves the slide 34 rearward and causes tabs 80 to move longitudinally away from tabs 78, pulling the MPC portion 24 away from MPC portion 22, as shown in FIG. 4. The relative movement between MPC portions 22 and 24 retracts pins 50 from sockets 52, effecting separation of portions 22 and 24.

The receptacle 36 of the connector tool 26 is adapted to receive the two separated portions 22 and 24 of the MPC 25. The receptacle 36 of the connector tool 26 has one pair of laterally opposing tabs 82 and one pair of laterally opposing tabs 84 formed on the slide 34, as shown in FIG. 5. The tabs 82 are stationarily connected to the head unit 32, and tabs 84 are integrally formed with the slide 34 and are therefore movable with the slide 34 relative to tabs 82. The tabs 82 and 84 are longitudinally separated from one another at opposite ends of the receptacle 36 of the connector tool 26 to allow the tabs 82 and 84 to engage the shoulders 64 and 68 of the portions 22 and 24, respectively, after insertion of MPC 25 into the receptacle 36 of the connector tool 26. When the separated portions 22 and 24 are placed into the receptacle 36 of the connector tool 26, the tabs 82 engage shoulders 64 on the male portion 22 while the tabs 84 engage shoulders 68 on the female portion 24.

During connection of the MPC portions 22 and 24, the male MPC portion 22 remains stationary because the tabs 82 engage the shoulders 64. Squeezing the handles 30 moves the slide 34 forward and causes the tabs 80 to engage the shoulders 66 on the female MPC portion 24, moving the female portion 24 toward the male MPC portion 22. The relative movement between MPC portions 22 and 24 inserts pins 50 into sockets 52, effecting connection of the MPC portions 22 and 24, as shown in FIG. 6.

The relative movement between MPC portions 22 and 24 in the receptacles 36 of both tools 20 and 26 by contact with the tabs achieves lateral and longitudinal alignment of the pins 50 with the corresponding sockets 52 throughout the relative movement between portions 22 and 24 during both connection and separation. The lateral and longitudinal alignment allows the pins 50 to be inserted into or extracted from sockets 52 without bending or breaking the pins, because the pins 50 are longitudinally aligned with the sockets 52. Also, applying separation and connection forces by the appropriate tabs to the shoulders 62, 64, 66, and 68 during connection and separation eliminates the possibility of damaging lead wires 56 and 57, as would occur by flexing and gripping the lead wires 56 and 57 when attempting to connect or separate the MPC portions 22 and 24 by hand.

The connector tool 26 and the separator tool 20 have similar features, except for certain dissimilarities specifically discussed below. The common aspects of both tools 20 and 26 will first be explained.

Details regarding the head unit 32 can be better understood by reference to FIGS. 3, 5, 7, and 9. The head unit 32 is attached to the forward end of the main body 28 in front of the handle frame 29. The head unit 32 of the tools 20 and 26 is essentially similar, with the exceptions of opposite directions of translation of the slide 34 when the handles 30 are squeezed, the types of insert tips 86 and 88 used, the shape of the receptacle 36, and the shape of forward ends of projection portions 90 of the U-shaped slide member 34.

Figure 7:
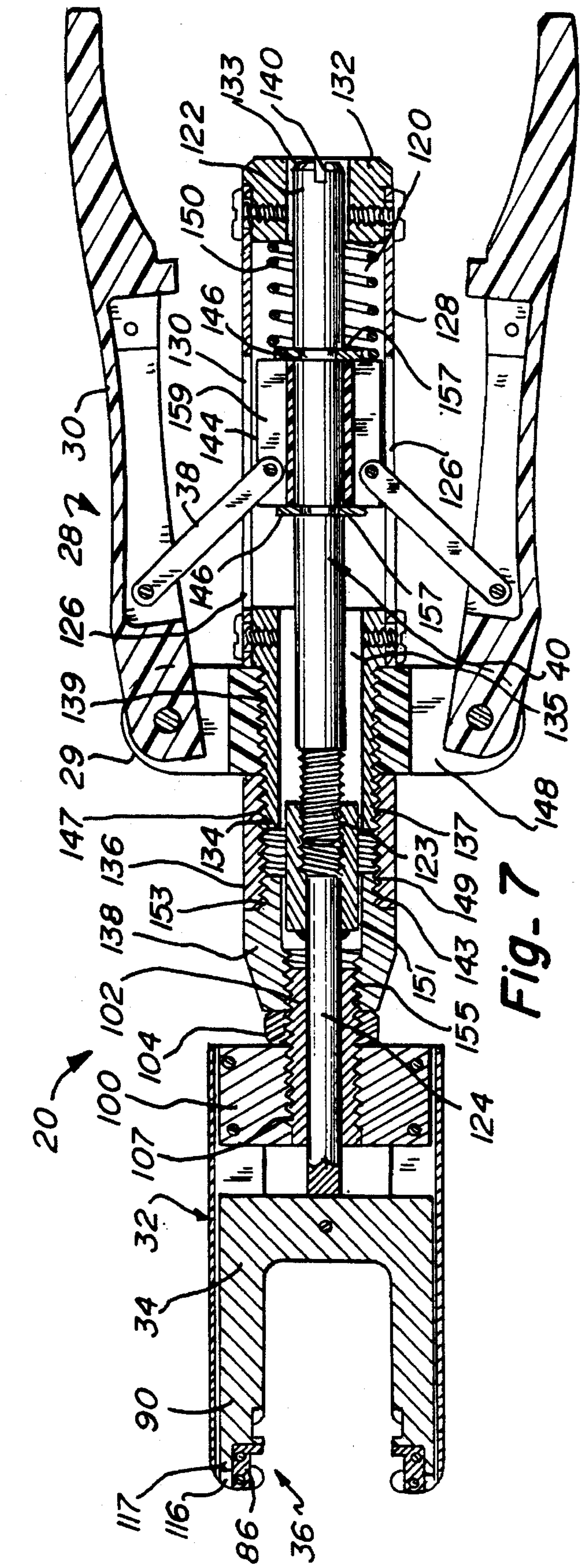
FIG. 7 is a horizontal plane section view of the separator tool shown in FIG. 1, illustrating the relative position of elements before squeezing handles of the tool to separate the portions of the MPC.
Figure 9:
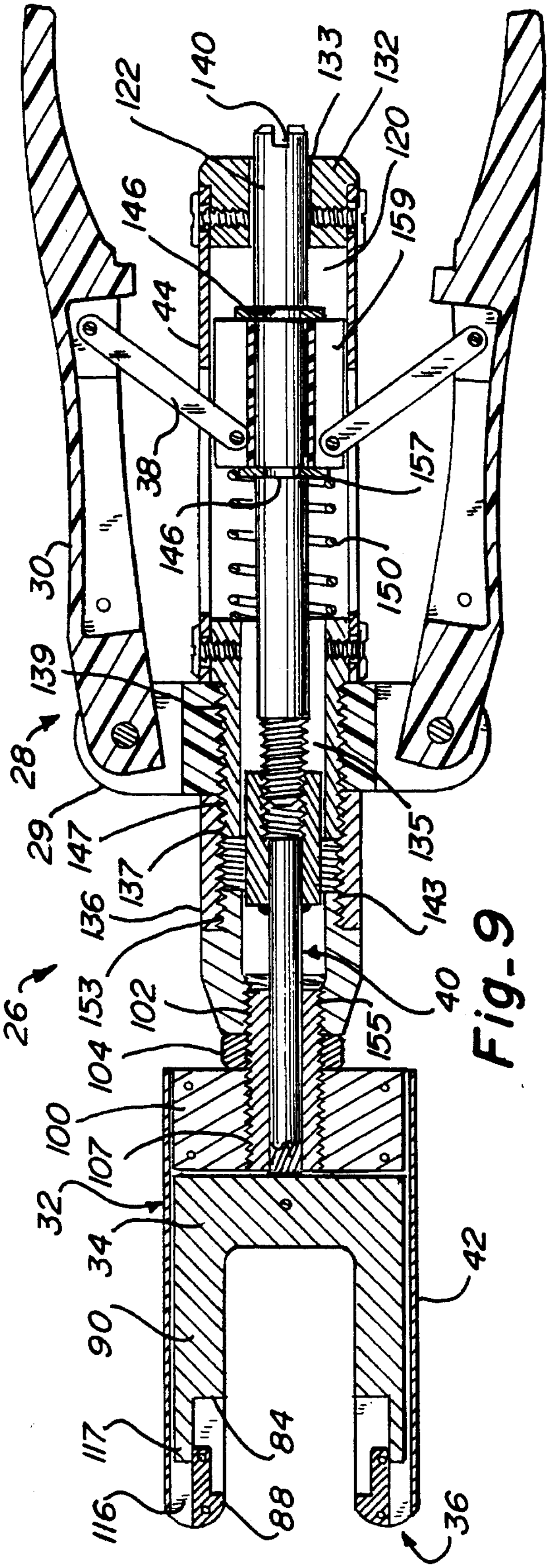
FIG. 9 is a horizontal plane section view of the connector tool shown in FIG. 6, illustrating the relative position of elements before squeezing handles of the tool to connect the portions of the MPC.

The head unit 32 includes a base 100, the two rails 42, the slide 34, the insert tips 86 and 88, a tubular connector 102 and a jam nut 104, as shown in FIGS. 5, 7 and 9. The base 100 has a cylinder portion 106 with an internally threaded bore 107 and opposing flanges 108 extending laterally away from the cylinder portion 106. The tubular connector 102 has a threaded exterior surface, and a forward end thereof is threaded into the bore 107 of the cylinder portion 106. The rear end of the tubular connector 102 is threadably connected to the main body 28. The jam nut 104 is threaded onto the tubular connector 102 between the base 100 and the main body 28 to secure the head unit 32 and main body 28 at desired relative longitudinal positions.

Attached to the flanges 108 on laterally opposite sides of the base 100 are the elongated U-shaped rails 42, as shown in FIGS. 3 and 5. The rails 42 extend parallel to one another from the base 100. The cross sectional U-shape of each rail 42 includes two legs 112 and 114. The lower (as shown) one leg 114 is wider than the other leg 112. Each flange 108 is inserted into the concavity of the U-shaped rail 42 between the two legs 112 and 114 at the rear end of the rails 42 and is releasably secured there by suitable fasteners, for example pins 115. The concavities of the rails 42 face one another, with the longer legs 114 laterally opposite from one another on the bottom of the head unit 32 as shown in FIG. 11 and 12. Positioned between the rails 42 is the slide 34. The slide 34 has a U-shape (in horizontal plan, as shown) with the laterally separated exterior edges of the two forward projecting portions 90 supported on and confined within the concavities of the rails 42. The rails 42 create a movement guide track for the slide 34, providing lateral and longitudinal stability over the range of movement of the slide 34 within the rails 42, as shown in FIG. 4.

The insert tips 86 and 88 are releasably attached at the forward ends of each of the rails 42, between the legs 112 and 114, as shown in FIGS. 3 and 5. The insert tips 86 and 88 are placed between the legs 112 and 114 of the rails 42 so that there is a gap 116 between the insert tips 86 and 88 and the curved base portion of the U-shaped rails 42 which connects the two legs 112 and 114. The insert tips 86 and 88 have different configurations for each of the tools 20 and 26.

In the head unit 32 of the separator tool 20, the laterally opposing tabs 80 are integrally formed at the forward end of each of the forward projecting portions 90 of the slide 34, as shown in FIGS. 3 and 7. The tabs 80 extend laterally inwardly from the projecting portions 90. The tabs 80 are adapted to engage the male portion 22 and translate it away from the female portion 24, effecting separation of the MPC, as discussed above.

The tabs 78 are integrally formed with the insert tips 86. The insert tip tabs 78 also extend laterally inwardly between the rails 42 from each insert tip 86, as shown in FIG. 3. The insert tip tabs 78 and the slide tabs 80 are sized such that, when adjacent to one another, they fit into the opposing notch 60 (FIG. 2) of the MPC 25.

A forward extension 117 of each slide projecting portion 90 extends beyond the slide tabs 80 and slidably fits into the gap 116 between the insert tip 86 and the U-shaped rail 42, as shown in FIG. 7. The positioning of the forward extension 117 of the slide projecting portions 90 into the gaps 116 provides added lateral and longitudinal support for the separator slide 34 as the separator slide moves along the rails 42.

When the connected portions 22 and 24 of the MPC 25 are inserted into the receptacle 36 of the separator tool 20 prior to separation, as shown in FIG. 3, each portion 22 and 24 rests on the wider lower leg 114 of both of the rails 42. The legs 114 support the portions 22 and 24 of the MPC 25 in the receptacle 36.

Referring to FIGS. 3 and 12, the female portion 24 of the MPC 25 contacts the separator slide tabs 80 while the male portion 22 contacts the separator insert tip tabs 78. The insert tips 86 and the legs 112 and 114 of the rails hold the male portion 22 in longitudinal and lateral alignment. The slide 34 and the longer leg 114 of the rail 42 hold the female portion 24 in lateral and longitudinal alignment throughout separation.

Figure 10:
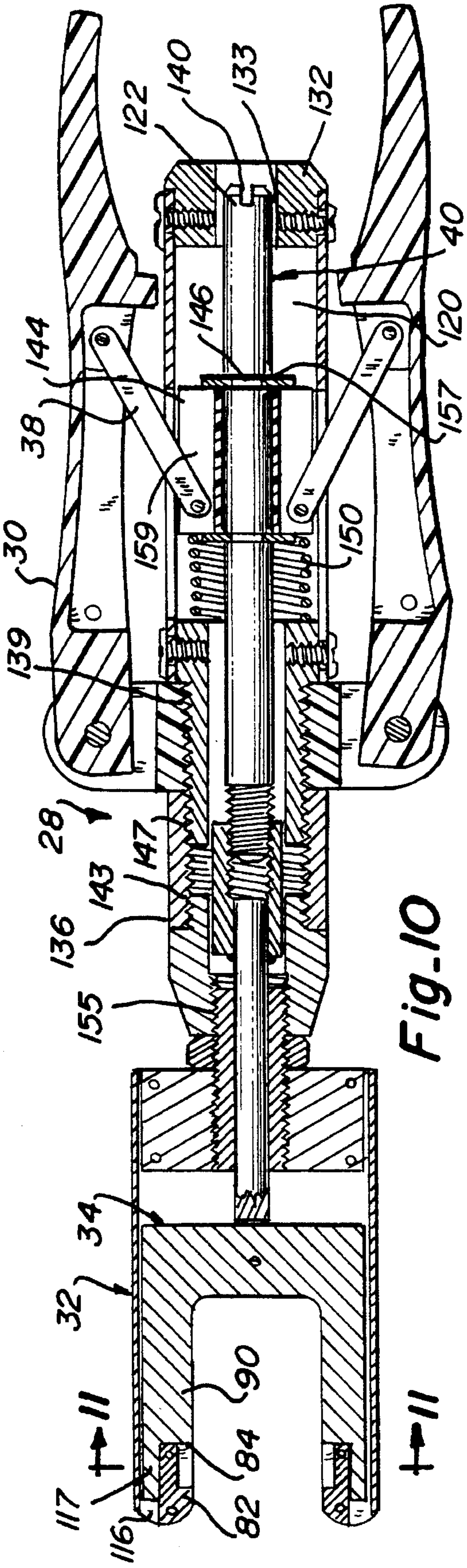
FIG. 10 is a horizontal plane section view of the connector tool similar to that shown in FIG. 9, illustrating the relative position of elements after squeezing handles of the tool to connect the portions of the MPC.

The head unit 32 of the connector tool 26, as shown in FIGS. 5, 9 and 10, includes two pairs of laterally opposing tabs 84 and 82. The laterally opposing tabs 84 are integrally formed as shoulder-like surfaces at the forward end of each of the projecting portions 90 of the slide 34. The 84 are used to engage the female portion 24 to press it towards the male portion 22 to effect connection of the MPC portions 22 and 24.

The tabs 82 are integrally formed with the insert tips 88. The insert tips 88 are positioned at the forward ends of the rails 42. The tabs 82 and 84 are therefore longitudinally spaced from one another approximately the full longitudinal distance of the receptacle 36 in the connector tool 26.

The forward extensions 117 of the forwardly projecting portions 90 extend beyond the slide tabs 84 and slidably fit into the gaps 116, as shown in FIG. 9 and 10. The confinement of the forward extensions 117 in the gaps 116 provides lateral and longitudinal guidance for the slide 34 as it moves along the rails 42.

When the connector slide 34 is retracted a maximum distance towards the main body 28, the receptacle 36 is prepared for the insertion of the separated portions 22 and 24 of the MPC 25, as shown in FIG. 5. The tabs 82 abut the shoulder 64 of the male portion 22 and hold the male portion 22 in a fixed position. The female portion 24 is contacted by the tabs 84. The female portion 24 is then pressed towards the male portion 22, inserting the pins 50 into the sockets 52, thus effecting connection of the MPC portions 22 and 24, as shown in FIG. 5.

With the two portions 22 and 24 of the MPC 25 inserted into the receptacle 36 of the connector tool 26 prior to connection, as shown in FIG. 5, each MPC portion 22 and 24 rests on the wider leg 114 of both rails 42. The wider legs 42 provide vertical support to the portions 22 and 24 of the MPC 25, as shown in FIG. 11. The insert tips 88 and the lower legs 114 of the rails 42 hold the male portion 22 in longitudinal and lateral alignment while the edges of the connector slide 34 hold the female portion 24 of the MPC 25 in lateral and longitudinal alignment throughout connection.

The main body 28, referring to FIGS. 7, has an internal cavity 120 along its entire length. Disposed within the cavity 120 inside the main body 28 is the actuating mechanism 40. The actuating mechanism comprises a push rod 122 connected by a thread joint 123 to a plunger 124. The plunger 124 extends beyond the main body 28 through the cylinder portion 106 of the base 100 of the head unit 32 and operably connects to the moveable slide 34. The actuating mechanism 40 is longitudinally moveable within the cavity 120.

The main body 28 also provides a guide surface 126 for the actuating mechanism 40 to move longitudinally. Along the sides of the handle tube 128 are symmetrically opposed openings 130 (only one shown) extending into the internal cavity 120. The links 38 extend through the openings 130 to attach the handles 30 to the push rod 122. A plug cap 132 having an axial hole 133 is removably secured in the bottom end of the handle tube 128.

Referring to FIG. 7, a first coupling unit 134, having a cylindrical bore 135 and exterior threading 137 on its forward portion, is operably attached to the handle tube 128 such that its exterior threading 137 extends beyond the end of the handle tube. The handle frame 29, having an internally threaded bore 139, is connected by the first coupling unit 134 to the handle tube 128, leaving a portion of the first coupling unit 134 extending beyond the handle frame 29.

A second coupling unit 136, shown in FIG. 7, having an internally threaded bore 143, is operably attached by a thread joint 147 to the top end of the first coupling unit 134, above the handle frame 29. The second coupling unit 136 is also attached by a thread joint 149 to an adapter cone 138. The adapter cone 138 has a bore 151 and external threading 153 on its bottom portion. The adapter cone 138 has an internal threaded bore 155 at its top end for connection to the head unit 32 by the tubular connector 102.

The push rod 122 of the actuating mechanism is axially aligned within the main body 28. At the forward end of the push rod 122, where it slidably resides in the axial hole 133 of the plug cap 132, the push rod has a screwdriver slot 140 across its diameter for use in adjusting the relative length of the actuation mechanisms 40 in the tools 20 and 26. The distance that the slide 34 translates toward or retracts from the main body 28 is calibrated by this adjustment to be greater than the length of the pins 50, thereby insuring adequate engagement and disengagement of the male portion 22 from the female portion 24.

At the forward end of the actuating mechanism 40 a clevis 142 attaches to the slide 34, as shown in FIGS. 3 and 5. The actuating mechanism 40 is maintained in slidable axial alignment within the cavity 120 by both an annular sleeve-like collar 144 and the close tolerances through the adapter cone 138 and tubular connector 102, as shown in FIGS. 7–10. The collar 144 is releasably attached to the push rod 122. The outer cylindrical surface of the collar 144 closely fits but is slidable within the cavity 120 of the main body 28. The inner cylindrical surface of the collar 144 closely fits and is slidable along the push rod 122. The collar 144 is held at a particular location on the push rod 122 by snap rings 146 that fit into circumferential grooves 157 at locations on the push rod 122.

The handle frame 29 includes a clevis 148 extending laterally from opposite sides, as shown in FIGS. 1 and 7. The forward end of each handle 30 is pivotally connected to each clevis 148 so that the handle 30, when squeezed, pivots about the point of its connection to the clevis 148.

Each handle 30 is connected to the actuating mechanism 40 by the link 38 which passes through the opposing openings 130 in the handle tube 128. The inner ends of the links 38 extend into a longitudinal slot 159 formed in the collar 144, where the inner link ends pivotably connect to the collar 144, as seen in FIG. 7. The collar 144, in turn, is releasably attached to the push rod 122 of the actuating mechanism 40. The links 38 functionally interact with the actuating mechanism 40 through the collar 144.

When the handles 30 are squeezed, the link 28 translates the collar 144 along the cavity 120 inside the handle tube 128, which in turn makes the actuating mechanism 40 move the slide 34 to provide the forces to either separate or connect the MPC 25.

Figure 8:
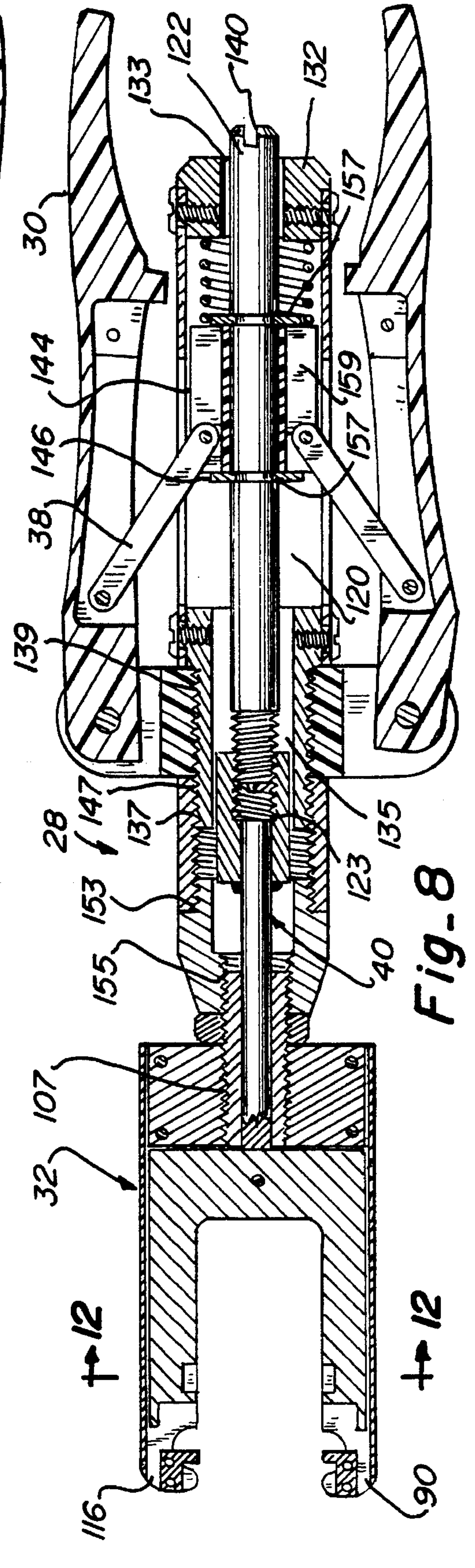
FIG. 8 is a horizontal plane section view of the separator tool similar to that shown in FIG. 7, illustrating the relative position of elements after squeezing handles of the tool to separate the portions of the MPC.

In the separator tool 20, the front end of each link 38 is connected to the handle 30 near the location where the forward end of each handle 30 connects to the clevis 148. The links 38 are angled to converge laterally inwardly and rearwardly toward the actuation mechanism 40, as shown in FIGS. 7 and 8.

To maintain tabs 78 and 80 in the receptacle 36 in the separator tool 20 in position to receive the connected portions 22 and 24 of the MPC 25, the slide tabs 80 must be adjacent to or abut the insert tip tabs 78, as shown in FIG. 7. To achieve this position, a spring 150 under compression is placed between the collar 144 and the plug cap 132. The compression spring 150 forces the collar 144 forward toward the head unit 32 of the separator tool 20, thus biasing the slide 34 forward to abut the tabs 78 and 80. The force the spring 150 is also transferred through the links 38 to bias the handles 30 outwardly to a position where they may be squeezed.

After two connected portions 22 and 24 of the MPC 25 are placed in the receptacle 36 of the separator tool 20 prior to separation, as shown in FIG. 3, squeezing the handles 30 separates the two portions 22 and 24 of the MPC 25, as shown in FIG. 4. Squeezing the handles 30 causes the links 38 to push the collar 144 to the rear. The collar 144 is operably connected to the push rod 122 of the actuating mechanism 40. The actuating mechanism 40 then moves rearwardly within the cavity 120 of the main body 28. The slide 34, being attached by the clevis 142 to the plunger 124 of the actuating mechanism 40, is retracted toward the base 100 of the head unit 32. While the insert tip tabs 78 engage and hold stationary the shoulders 62 of the female portion 22, the rearward movement of the slide tabs 80, while engaging the shoulders 66 of the female portion 24, causes the female portion 24 to retract away from the stationary male portion 22, as shown in FIG. 3. The slide 34 is retracted a sufficient distance to disengage the pins 50 entirely from the sockets 52, thus separating the two portions 22 and 24 of the MPC 25, as seen in FIG. 4.

In the connector tool 26, the rear end of each link 38 is connected to the handle 30 near the rear free end of the handle opposite from the location where the forward end of each handle 30 connects to the clevis 148. The links 38 are angled to converge laterally inwardly and forwardly toward the actuation mechanism 40, as shown in FIGS. 9 and 10.

To maintain the receptacle 36 in the connector tool 26 in a position ready to receive the separated portions 22 and 24 of an MPC 25 prior to connection, the slide 34 must be retracted rearwardly. A spring 160 under compression is placed between the collar 144 and the first coupling unit 134. With the spring 160 in position, the compression force of the spring is transferred to the collar 144 and from the collar 144 through the links 38. The force from the links 38 bias the handles 30 outwardly to a position where they can be squeezed.

After the separate portions 22 and 24 of the MPC 25 have been placed in the head unit 32 of the connector tool 26, as shown in FIG. 5, squeezing the handles 30 connects the portions 22 and 24. Squeezing the handles 30 causes the forward ends of the links 38 to press against the collar 144, moving it forward. The collar 144 is connected to the actuating mechanism 40 to translate the actuating mechanism 40 within the cavity 120 of the main body 28 forward toward the head unit 32. The slide 34, attached to the actuating mechanism 40 by the clevis 142, is thus translated forward along the rails 42. The insert tip tabs 82 engage and hold stationary the shoulders 64 of the male portion 22. The slide tabs 84 engage the shoulders 68 of the female portion 24. As the slide 34 advances, it moves the female portion 24 a sufficient distance to fully insert the pins 50 entirely into the sockets 52, as shown in FIGS. 6 and 10.

The separation and connection of the MPC portions 22 and 24 has been described above in reference to specific positions of the portions 22 and 24 in the receptacles 36, the relative positions of the portions 22 and 24 can be reversed in the receptacles. The separation and connection function of the tools 20 and 26 are equally as effective when the relative positions of the portions 22 and 24 of the MPC 25 are reversed in the receptacle 36.

Numerous advantages accrue as a result of using the separator and connector tools 20 and 26. The separator and connector tools provides lateral and longitudinal support and longitudinal alignment throughout the separation and connection of MPC portions 22 and 24. The MPC portions are each aligned supported to facilitate separating and connecting without bending or breaking the pins of the MPC. The rails 42 provide firm, guided support for the slider during separation and connection. The handle-actuated actuating mechanism 40 provides a controllable unidirectional force which is applied to the portions of the MPC 25 through the slider 34. These features alleviate the twisting, bending and misalignment associated with manual separation and connection of MPCs 25, thus acting to reduce damage and the costs associated with replacing damaged MPCs. Furthermore the connection and disconnection of the MPC portions is achieved by mechanical contact of the tools 20 and 26 with the bodies of the MPC portions, thereby avoiding the necessity to grasp or otherwise manipulate the lead wires extending from the bodies of the MPC portions. As a consequence the incidence of broken lead wires during connection or disconnection is greatly reduced. Many other significant advantages and improvements are apparent after comprehension of the improved features of the present invention.

Presently preferred embodiments of the present invention and many of its improvements have been described with a degree of particularity. The previous descriptions are of preferred examples for implementing the invention. The scope of the invention should not necessarily be limited by this exemplary description but is defined by the scope of the following claims.

The invention claimed is:

1. A method of separating or connecting two portions of a multi-pin connector (MPC) in which each of the MPC portions includes a body, the body of one of the MPC portions includes a plurality of pins projecting therefrom, the body of the other one of the MPC portions includes a plurality of sockets positioned in locations corresponding to the pins to receive the pins therein when the MPC portions are connected, and wherein each body of each MPC portion further includes at least one shoulder formed thereon, said method comprising the steps of:

mechanically retaining the bodies of the MPC portions relative to one another with the pins and the sockets in lateral and longitudinal alignment with one another;

positioning tabs to contact the shoulders of the bodies of the MPC portions;

moving the MPC portions by moving the tabs while in contact with the shoulders of the bodies of the MPC portions; and moving the MPC portions toward and away from one another while maintaining the longitudinal and lateral alignment of the pins and sockets to accomplish one of connecting or separating the MPC portions, respectively.

2. A method as defined in claim 1 in which the shoulders of the bodies of each of two connected MPC portions are longitudinally separated by a notch, and said method further comprises steps of:

inserting the two tabs in the notch prior to separation of the MPC units;

stationarily positioning one tab; and moving the other tab away from the stationarily positioned tab.

3. A method as defined in claim 1 in which each of the MPC portions has two shoulders on laterally opposite sides of the body, and said method further comprises steps of:

stationarily positioning two tabs on laterally opposite sides of one another;

movably positioning another two tabs on laterally opposite sides of one another; and the two tabs on laterally opposite sides are positioned to contact the shoulders of the bodies of the MPC portions.

4. A method as defined in claim 2 in which the longitudinally separated shoulders on opposite lateral sides of the bodies define two laterally separated notches on opposite lateral sides of the connected MPC portions, said method further comprises steps of:

positioning the stationary and moveable tabs on the same lateral side into one notch on one lateral side of the connected MPC portions prior to separation; and positioning the stationary and moveable tabs on the same lateral side into the other notch on the other lateral side of the connected MPC portions prior to separation.

5. A method as defined in claim 2 in which the shoulders on the bodies of the two MPC portions longitudinally align with one another on longitudinally opposite ends of the MPC when the MPC portions are connected, and said method further comprising steps of:

stationarily positioning two tabs on laterally opposite sides of one another;

movably positioning another two tabs on laterally opposite sides of one another; and the two tabs on laterally opposite sides are positioned to contact the shoulders of the bodies of the MPC portions;

longitudinally separating the moveable and stationary tabs on the same lateral side from one another; and contacting the shoulders on opposite longitudinal positions of the two separated MPC portions between the longitudinally separated tabs prior to connecting the MPC portions.

6. A tool for separating or connecting two portions of a multi-pin connector (MPC), wherein one of the MPC portions includes a plurality of pins protecting therefrom and the other one of the MPC portions includes a plurality of sockets positioned in locations corresponding to the pins to receive the pins therein when the MPC portions are connected, each portion further including at least one shoulder formed thereon, the tool comprising:

a head unit having a receptacle adapted for receiving the two portions of the MPC, the head unit including a slide member extending to the receptacle and adapted to contact at least one of the two MPC portions;

an actuator mechanism operably connected to the head unit to move the slide member and the at least one MPC portion contacted by the slide member in at least one of a direction toward or a direction away from the other MPC portion to execute one of either connecting or separating the MPC portions, respectively;

the receptacle and the slide member contact and retain the MPC portions during movement of the MPC portions relative to one another to maintain the pins and sockets in lateral and longitudinal alignment with one another during connecting and separating to avoid bending the pins;

the slide member and the head unit each include tabs positioned to contact the shoulders of the MPC portions; and the relative movement of the MPC portions is accomplished while the tabs contact the shoulders of the MPC portions.

7. A tool as defined in claim 6 in which the shoulders of the connected MPC portions are longitudinally separated by a notch, and wherein:

one tab is stationarily positioned on the head unit;

another tab is connected to the slide unit; and the two tabs are received in the notch prior to separation of the MPC units.

8. A tool as defined in claim 7 in which each of the MPC portions has two shoulders on laterally opposite sides of the portion, the longitudinally separated shoulders on opposite lateral sides of the body define two laterally separated notches on opposite lateral sides of the connected MPC portions, and wherein:

two tabs are stationarily positioned on the head unit on laterally opposite sides of the receptacle from one another;

another two tabs are connected to the slide member on laterally opposite sides of the receptacle from one another; and the two tabs on each side of the receptacle are positioned to be received in the notch on that side of the connected MPC portions prior to separation of the MPC portions.

9. A tool as defined in claim 8 wherein:

the two tabs on each side of the receptacle adjoin one another prior to separation of the connected MPC portions.

10. A tool as defined in claim 6 in which the connected MPC portions have laterally opposite sides and the shoulders define notches which are laterally separated from one another, and wherein:

a first pair of tabs are operably attached at one lateral side of the receptacle at positions adapted to contact the shoulders at the notches on one lateral side of the connected MPC portions, one of the tabs of the first pair attached to the slide member and the other one of the tabs of the first pair attached stationarily to the head unit;

a second pair of tabs are operably attached at the other lateral side of the receptacle at positions adapted to contact the shoulders at the notches on the opposite lateral side of the connected MPC portions, one of the tabs of the second pair attached to the slide member and the other one of the tabs of the second pair attached stationarily to the head unit.

11. A tool as defined in claim 6 in which each of the MPC portions has two shoulders on laterally opposite sides of the portion, the shoulders on the portions longitudinally aligning with one another on longitudinally opposite ends of the MPC when the MPC portions are connected, and wherein:

two tabs are stationarily positioned on the head unit on laterally opposite sides of the receptacle from one another;

another two tabs are connected to the slide member on laterally opposite sides of the receptacle from one another;

the two tabs on the same lateral side of the receptacle are longitudinally separated from one another; and the two tabs on the same lateral side of the receptacle positioned to contact the shoulders on opposite longitudinal positions of the two separated MPC portions between the longitudinally separated tabs prior to connection of the MPC portions.

12. A tool as defined in claim 6 further comprising:

a main body to which the actuator mechanism is connected; and an element connected to the main body and to the actuator mechanism and adapted to move the actuator mechanism when manually manipulated.

13. A tool as defined in claim 6 further comprising:

a main body having an internal cavity in which the actuator mechanism is positioned; and at least one handle connected to the main body and to the actuator mechanism and adapted to move the actuator mechanism when squeezed by hand.

14. A tool as defined in claim 13 wherein:

the head unit further includes a base, a pair of laterally opposed and longitudinally extending parallel rails, and a slide member retained between the rails for translational movement in the longitudinal direction;

a pair of stationarily positioned tabs connected to the rails;

a pair of moveable tabs connected to move with the slide member; and the actuator mechanism is connected to the slide member.

15. A tool as defined in claim 14 wherein:

each handle is connected to the actuator mechanism by a linkage; and the position of the linkage is reversible to create movement of the slide member in one longitudinal direction to connect the MPC portions when the linkage is in one position and to create movement of the slide member in the other longitudinal direction to separate the MPC portions when the linkage is in the other position.

16. A tool for separating or connecting two portions of a multi-pin connector (MPC), comprising:

a head unit having a receptacle in which to receive the MPC portions and a moveable element adjacent the receptacle to contact the MPC portions received in said receptacle;

a main body operably connected to said head unit;

an actuating mechanism movably attached to said main body, said actuating mechanism connected to move said moveable element of said head unit in conjunction with movement of said actuating mechanism; and at least one handle pivotably connected to said main body and adapted to be moved by squeezing said handle toward said main body, said handle operably connected to said actuating mechanism to move said actuating mechanism and said moveable element upon squeezing to one of either separate or connect the MPC portions.

17. A tool as defined in claim 16, wherein:

said head unit further comprises a base having a cylindrical bore through which said actuating mechanism slidably extends;

a pair of laterally opposed and longitudinally extending parallel rails operably attached to said base, each of which has a forward end and a rearward end;

a slide member operably connected to said actuating mechanism, and said slide member retained between said rails for translational movement in the longitudinal direction;

a first pair of laterally opposing inwardly extending tabs, each of said first pair of tabs stationarily attached to said forward end of said rails; and a second pair of laterally opposing inwardly extending tabs, each of said second pair of tabs integrally formed on laterally opposing sides of said slide member;

said first and said second pairs of tabs adjoining said receptacle.

18. A tool as defined in claim 17, wherein:

said main body includes an internal cavity;

said actuating mechanism slidably resides within said cavity of said main body;

said handle has a forward end and a rearward end and is pivotally connected at its forward end to said main body; and further comprising:

at least one link operably interconnecting said handle and said actuating mechanism to translate said actuating mechanism within said cavity and to translate said slide member connected to said actuating mechanism upon squeezing said handle.

19. A tool as defined in claim 18 for separating two connected MPC portions in which each of the MPC portions includes a body and each body includes at least one shoulder formed thereon, wherein:

the two connected MPC portions are received within said receptacle of said head unit;

said link is operably attached to said rearward end of said handle to move said actuating mechanism rearwardly when said handle is squeezed;

said first pair of tabs engage at least one shoulder on the body of one of the MPC portions and said second pair of tabs engage at least one shoulder on the body of the other one of the MPC portions;

said actuating mechanism moves rearwardly when said one handle is squeezed to translate said slide member rearwardly with said second pair of tabs in contact with the shoulder on the body of the other of the MPC portions to connect the MPC portions.

20. A tool as defined in claim 18 for connecting two separated MPC portions in which each of the MPC portions includes a body and each body includes at least one shoulder formed thereon, wherein:

the two separated MPC portions are received within said receptacle of said head unit;

said link is operably attached to said forward end of said handle to move said actuating mechanism rearwardly when said handle is squeezed;

said first pair of tabs engage at least one shoulder on the body of one of the MPC portions and said second pair of tabs engage at least one shoulder on the body of the other one of the MPC portions; and said actuating mechanism moves forwardly when said one handle is squeezed to translate said slide member forwardly with said first and second pairs of tabs in contact with the shoulders on the bodies of the MPC portions to separate the MPC portions.

21. A tool for separating or connecting two portions of a multi-pin connector (MPC) comprising:

a head unit having a receptacle for receiving and supporting the two portions of the MPC, the head unit including a slide member extending to the receptacle to contact at least one of the two MPC portions;

an actuator mechanism operably connected to the head unit to move the slide member and the one MPC portion contacted by the slide member in at least one of a direction toward or a direction away from the other MPC portion to execute one of either connecting or separating the MPC portions, respectively.

* * * * *